(12) United States Patent
Koganehira et al.

(10) Patent No.: US 7,553,360 B2
(45) Date of Patent: Jun. 30, 2009

(54) INK COMPOSITION FOR INK JET RECORDING, RECORDING METHOD AND RECORDED MATTER

(75) Inventors: Shuichi Koganehira, Nagano-Ken (JP); Hironori Sato, Nagano-Ken (JP); Akira Mizutani, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/732,516

(22) Filed: Apr. 3, 2007

(65) Prior Publication Data

US 2007/0242119 A1  Oct. 18, 2007

(30) Foreign Application Priority Data

Apr. 4, 2006  (JP) ............... 2006-103481

(51) Int. Cl.
  *C09D 11/02* (2006.01)
  *B41J 2/01* (2006.01)

(52) U.S. Cl. .............. 106/31.58; 106/31.59; 106/31.86; 106/31.89; 347/100

(58) Field of Classification Search .............. 106/31.58, 106/31.59, 31.86, 31.89, 31.36, 31.68; 347/100
See application file for complete search history.

(56) References Cited

U.S. PATENT DOCUMENTS

| | | | | |
|---|---|---|---|---|
| 6,187,086 B1 * | 2/2001 | Rehman | .................. | 106/31.86 |
| 6,436,180 B1 * | 8/2002 | Ma et al. | ................. | 106/31.59 |
| 6,783,580 B2 * | 8/2004 | Tyvoll et al. | ............. | 106/31.58 |
| 6,808,556 B2 * | 10/2004 | Kelly-Rowley et al. | .. | 106/31.58 |
| 6,890,378 B2 * | 5/2005 | Yatake et al. | ............. | 106/31.59 |
| 7,052,536 B2 * | 5/2006 | Yatake | .................... | 106/31.58 |
| 7,125,446 B2 * | 10/2006 | Potenza et al. | ........... | 106/31.58 |
| 7,135,208 B2 * | 11/2006 | Kubota | .................... | 106/31.86 |
| 7,307,109 B2 * | 12/2007 | Yatake et al. | ............... | 523/160 |
| 2004/0186200 A1 * | 9/2004 | Yatake | .................... | 106/31.58 |
| 2005/0235870 A1 * | 10/2005 | Ishihara | ................... | 106/31.58 |
| 2007/0091156 A1 * | 4/2007 | Jackson | .................. | 106/31.58 |
| 2007/0266887 A1 * | 11/2007 | Koganehira et al. | ...... | 106/31.86 |

FOREIGN PATENT DOCUMENTS

| | | |
|---|---|---|
| JP | 2000-327962 | 11/2000 |
| JP | 2001-072905 | 3/2001 |
| JP | 2003-012583 | 1/2003 |
| JP | 2003-192965 | 7/2003 |
| JP | 2003-306620 | 10/2003 |
| JP | 2004-210996 | 7/2004 |
| JP | 2005-194500 | 7/2005 |

OTHER PUBLICATIONS

Patent Abstracts of Japan of JP 2005-194500 dated Jul. 21, 2005.
Patent Abstracts of Japan of JP 2001-072905 dated Mar. 21, 2001.
Patent Abstracts of Japan of JP 2003-012583 dated Jan. 15, 2003.
Patent Abstracts of Japan of JP 2004-210996 dated Jul. 29, 2004.
Patent Abstracts of Japan of JP 2003-306620 dated Oct. 31, 2003.
Patent Abstracts of Japan of JP 2003-192965 dated Jul. 9, 2003.
Patent Abstracts of Japan of JP 2000-327962 dated Nov. 28, 2000.

* cited by examiner

*Primary Examiner*—Helene Klemanski
(74) *Attorney, Agent, or Firm*—Ladas and Parry LLP

(57) ABSTRACT

There is provided an ink composition that, even on various recording media, especially gloss paper of a printing paper base, can yield an image having excellent gloss, can realize good recovery from clogging and handleability of recorded matter, and, at the same time, can realize excellent ejection stability and color reproduction. The ink composition for ink jet recording comprises at least a colorant, water, an alkanediol, and a surfactant, wherein the alkanediol comprises a water soluble 1,2-alkanediol and a water soluble alkanediol having a hydroxyl group at both ends of its main chain, and the surfactant is a polyorganosiloxane.

18 Claims, No Drawings

INK COMPOSITION FOR INK JET RECORDING, RECORDING METHOD AND RECORDED MATTER

BACKGROUND OF THE INVENTION

1. Field of Invention

The present invention provides an ink composition for ink jet recording, which, even on various recording media, especially gloss paper of a printing paper base, can yield images having excellent gloss and color reproduction and, at the same time, can realize excellent ejection stability and recovery from clogging, and a method for ink jet recording using the ink composition.

2. Background Art

Ink jet recording is a printing method wherein droplets of an ink are ejected and deposited on recording media, such as paper, to perform printing. An innovative advance of a recent ink jet recording technique has made it possible to realize the production of images having quality comparable to images produced by silver salt photography or images yielded by high-definition printing realized only by offset printing. This trend has led to the development of inks for ink jet recording that can realize images having a high level of gloss comparable to the gloss of images produced by silver salt photography, using the so-called specialty papers which are recording media having a high level of gloss comparable to photographic paper, art paper and the like used in the field of silver salt photography and offset printing. Further, inks for ink jet recording which can realize image quality comparable to the image quality of images produced by silver salt photography even on plain paper, have also been developed.

Inks, which have been generally used for ink jet recording, are water-based inks that comprise water as a main component and a colorant and various additives. Regarding the colorant, the development of pigment-based inks utilizing the properties of the pigment has recently been forwarded because pigments are superior to dyes in weatherfastness properties such as lightfastness, gasfastness, waterfastness, and moisturefastness. For example, Japanese Patent Laid-Open No. 194500/2005 discloses a pigment-based ink having feathering- or bleeding-free properties and excellent gloss on specialty papers that have been realized by using a polysiloxane compound as a surfactant and adding an alkanediol such as 1,2-hexanediol as a solubilizer additive to the ink. Further, Japanese Patent Laid-Open Nos. 72905/2001 and 12583/2003 disclose an ink containing 1,2-hexanediol, which is a water soluble alkanediol, and 1,5-pentanediol, which is a water soluble alkanediol having a hydroxyl group at both ends of its main chain, as additives. The claimed advantage of this ink is feathering- or bleeding-free properties on plain papers.

In recent years, spreading of a technique for image formation from digital data and consideration to natural environment have led to needs, particularly in photographic markets, for ink jet printed matter that can reduce the necessary amount of chemical substances to be used and the amount of waste liquid to be treated, and an ink jet recording system has begun to be applied also in minilab shops. In minilab, color reproduction and stable reproduction of ink jet recorded matter of a printing paper base similar to silver salt photographs are required, and glossy impression comparable to that of silver salt photographs is also required. Further, in recent years, services in which such recorded matter is put into a glassed-in frame immediately after printing and is then handed to a customer on site or is then sent to a customer by mail, are advanced. Putting the ink jet recorded matter into a glassed-in frame immediately after printing, however, sometimes causes dew formation on the glass in the case of some recording media and service environment.

The use of a high-penetration ink containing the above polysiloxane surfactant and 1,2-hexanediol as a solubilizer for the polysiloxane surfactant from the viewpoint of solving the above problem can improve the glossy impression, but sometimes poses a problem of the handleability of the ink jet recorded matter.

SUMMARY OF THE INVENTION

The present inventors have now found that the addition of a combination of two specific alkanediols with a polyorganosiloxane compound as a surfactant to ink can realize an ink composition that, even on various recording media, especially gloss paper of a printing paper base, can yield an image having excellent gloss, can realize good recovery from clogging and handleability of recorded matter, and, at the same time, can realize excellent ejection stability and color reproduction. The present invention has been made based on such finding. The expression "handleability of recorded matter" as used herein means that, when recorded matter is put into a frame formed of, for example, a glass plate or an acrylic plate, an ink solvent left from the recorded matter is not deposited onto the frame.

Accordingly, an object of the present invention is to provide an ink composition that, even on various recording media, especially gloss paper of a printing paper base, can yield an image having excellent gloss, can realize good recovery from clogging and handleability of recorded matter, and, at the same time, can realize excellent ejection stability and color reproduction.

According to the present invention, there is provided an ink composition for ink jet recording, comprising at least a colorant, water, an alkanediol, and a surfactant, wherein the alkanediol comprises a water soluble 1,2-alkanediol and a water soluble alkanediol having a hydroxyl group at both ends of its main chain and the surfactant is a polyorganosiloxane.

The present invention can realize an ink composition that, even on various recording media, especially gloss paper of a printing paper base, can yield an image having excellent gloss, can realize good recovery from clogging and handleability of recorded matter, and, at the same time, can realize excellent ejection stability and color reproduction.

DETAILED DESCRIPTION OF THE INVENTION

The ink composition for ink jet recording according to the present invention comprises a colorant, water, an alkanediol, and a surfactant as indispensable ingredients. The alkanediol comprises two types of alkanediols, that is, a water soluble 1,2-alkanediol and a water soluble alkanediol having a hydroxyl group at both ends of its main chain. The surfactant is a polyorganosiloxane. The individual ingredients will be described.

<Alkanediol>

The alkanediol used in the ink composition for ink jet recording according to the present invention comprises at least two types of alkanediols, that is, a water soluble 1,2-alkanediol and a water soluble alkanediol having a hydroxyl group at both ends of its main chain. The use of these two specific types of alkanediols together with a surfactant, which will be described later, can realize an ink composition that, even on a porous gloss paper of a printing paper base, which has excellent ink solvent absorption, but on the other hand, an ink solvent is sometimes left from recorded matter under some environment, can realize excellent glossy impression and anti-clogging properties and can suppress the leaving of the ink solvent from the recorded matter. Further, even when the ink composition is applied to plain paper, the sharpness of character edge can be improved and, thus, the ink composition is suitable for applications of recorded matters such as covenants with small font sizes. The reason why these advantages can be realized has not been elucidated yet but is considered as follows. As described above, in conventional high-penetration inks for ink jet recording, the use of 1,2-hexanediol or 4-methyl-1,2-pentanediol is preferred from the viewpoint of lowering the surface tension to improve a glossy impression. In order to realize very low surface tension by adding only a water soluble 1,2-alkanediol such as 1,2-hexanediol, however, the addition of a large amount of the 1,2-alkanediol is necessary. For example, the surface tension of a 15 wt % aqueous solution of 1,2-hexanediol or 4-methyl-1,2-pentanediol is 25 to 26 mN/m. The addition of this substance increases the viscosity of the ink, and, thus, ink weight of dots is reduced. Accordingly, the ink weight of dots cannot be accurately regulated without difficulties. As a result, upon the ejection of ink from the head, unfavorable phenomena sometimes occur such as a shift in impact position of ink droplets, misting of ink, and poor print durability, often leading to lowered color development, deteriorated graininess, uneven coagulation and color-to-color bleeding which are causative of printing failure. On the other hand, the addition of only a water soluble alkanediol having a hydroxyl group at both ends of its main chain such as 1,5-pentanediol disadvantageously results in deteriorated glossy impression, for example, because the surface tension of a 15 wt % aqueous solution of 1,5-pentanediol is not less than 35 mN/m.

When the water soluble 1,2-alkanediol and the water soluble diol having a hydroxyl group at both ends of its main chain are simultaneously incorporated, an improvement in glossy impression and rendering the surface tension of ink compatible with the output frequency of ink droplets suitable in ink jet recording can be realized, because the water soluble 1,2-alkanediol can effectively lower the surface tension to improve the glossy impression while the water soluble diol having a hydroxyl group at both ends of its main chain can regulate the surface tension at each frequency. Such regulation can improve the accuracy of ejection weight and the impact accuracy of ink droplets on recorded matter.

In the present invention, the water soluble 1,2-alkanediol is preferably an optionally branched 1,2-alkanediol having 5 or 6 carbon atoms, and examples thereof include 4-methyl-1,2-pentanediol, 1,2-pentanediol, 3,3-dimethyl-1,2-butanediol, and 1,2-hexanediol. Among them, 1,2-hexanediol and/or 4-methyl-1,2-pentanediol are particularly preferred.

The content of the water soluble 1,2-alkanediol is preferably not less than 3% by weight, more preferably 6 to 15% by weight, based on the whole ink composition. When the content of water soluble 1,2-alkanediol is in the above-defined range, lowering and/or fluctuation of ink viscosity in low-temperature and high-temperature states can be suppressed, contributing to stable ink ejection.

The water soluble alkanediol having a hydroxyl group at both ends of its main chain preferably contains an optionally branched alkanediol having 3 to 10 carbon atoms, and examples thereof include 1,3-propanediol, 1,4-butanediol, 1,5-pentanediol, and 1,6-hexanediol. Among them, 1,5-pentanediol is particularly preferred from the viewpoints of viscosity and durability of members used in an ink jet recording apparatus.

The content of the water soluble alkanediol having a hydroxyl group at both ends of its main chain is preferably 3 to 15% by weight, more preferably 3.0 to 6.0% by weight, based on the whole ink composition.

When the content of the water soluble alkanediol is in the above-defined range, the lowering of content of the wetting agent, for example, glycerin, as a main component of the ink solvent, which is left from the recorded matter, and/or the leaving of the wetting agent can be effectively suppressed. Further, the anti-clogging property can be improved without containing the wetting agent in an amount exceeding 15% by weight. That is, the addition of the water soluble alkanediol in the above-defined amount range is effective in both viscosity lowering and prevention of the solvent from being left.

In the present invention, the content ratio of the water soluble 1,2-alkanediol to the water soluble alkanediol having a hydroxyl group at both ends of its main chain is preferably 10:1 to 1:1 on a weight basis. When both the alkanediols are mixed together at this defined ratio range, printing of the ink on a gloss paper of a printing paper base can realize an improvement in glossy impression by virtue of lowered surface tension and stable ejection by virtue of the regulation of surface tension at a specific frequency.

In printing on plain paper, the edge sharpness of small fonts can be improved through an improvement in good ink droplet impact position accuracy.

Further, in the present invention, the ink composition may contain, as a penetration solvent, 1,2-alkanediols having 5 to 10 carbon atoms and/or 1,2-alkanediols having 3 to 10 carbon atoms and/or lactams and/or lactones, to which a polyoxyethylene chain and/or a polypropylene chain have been added.

<Surfactant>

The ink composition for ink jet recording according to the present invention contains a surfactant as an indispensable ingredient. When the recording medium used has on its surface a resin coating receptive to ink, the use of a surfactant in the ink composition for ink jet recording can realize images having excellent gloss even on recording media, in which greater importance is attached to a glossy impression, for example, photographic paper.

In the present invention, organopolysiloxane surfactants are used as the surfactant. The use of the organopolysiloxane surfactant is advantageous in that, since the above specific two alkanediols are contained, the solubility of the surfactant in the ink is improved to suppress the occurrence of insolubles and the like, whereby an ink composition having better ejection stability can be realized.

More preferably, the ink composition contains one or at least two compounds represented by formula as the organopolysiloxane surfactant:

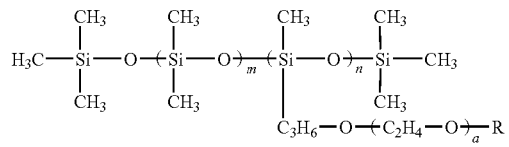

wherein R represents a hydrogen atom or a methyl group; a is an integer of 7 to 11; m is an integer of 20 to 70; and n is an integer of 2 to 5. When such specific organopolysiloxane surfactants are used, the surface of the recorded matter having concaves and convexes can be further rendered smooth.

In another preferred embodiment of the present invention, one or at least two compounds represented by the above formula, wherein R represents a hydrogen atom or a methyl group, a is an integer of 2 to 5, m is an integer of 20 to 70, and n is an integer of 2 to 4, may be contained as the polysiloxane compound.

When the above polyorganosiloxane compounds are contained, preferably, a polysiloxane compound represented by the above formula, wherein R represents a hydrogen atom or a methyl group; a is an integer of 9 to 13; m is an integer of 2 to 4; and n is 1 or 2, is further contained as the surfactant. The combined use of this polysiloxane compound can render the surface of the recorded matter having concaves and convexes more smooth.

The reason why the incorporation of the above specific polyorganosiloxane compounds can render the recorded matter surface having concaves and convexes smooth, is considered as follows. Specifically, for example, in an aqueous solution comprising 20% by weight of glycerin (glycerol), 10% by weight of 1,2-hexanediol, and 0.1% by weight of the above surfactant, the surface tension of the aqueous solution at 1 Hz is not more than 25 mN/m. That is, the incorporation of the above surfactant can realize a very low surface tension of the glycol-containing aqueous solution. When Surfynol 465, which is an acetylene glycol surfactant, is brought to an aqueous solution having the same composition as described above, the surface tension of the aqueous solution is not less than 25 mN/m.

Such surfactants may be commercially available products, and examples thereof include KF-954A, KF-353A, KF6017, X-22-6551 and AW-3 (all the above products being manufactured by The Shin-Etsu Chemical Co., Ltd.).

The content of the surfactant in the ink composition according to the present invention is preferably 0.01 to 2.00% by weight, more preferably 0.05 to 0.50% by weight. In particular, when the surfactant wherein R represents a methyl group is used, preferably, the content of the surfactant is larger than the case where the surfactant wherein R represents H is used.

Other surfactants, specifically fluorosurfactants, acetylene glycol surfactants, anionic surfactants, nonionic surfactants, amphoteric surfactants and the like, may be further added to the ink composition according to the present invention.

Examples of acetylene glycol surfactants among these other surfactants include 2,4,7,9-tetramethyl-5-decyne-4,7-diol, 3,6-dimethyl-4-octyne-3,6-diol, 3,5-dimethyl-1-hexyn-3-ol, or 2,4-dimethyl-5-hexyn-3-ol. Acetylene glycol surfactants may also be commercially available products. Examples thereof include Olfine E1010, Olfine STG, or Olfine Y (tradename, manufactured by Nissin Chemical Industry Co., Ltd.) and Surfynol 61, Surfynol 104, Surfynol 82, Surfynol 465, Surfynol 485 or Surfynol TG (tradename, manufactured by Air Products and Chemicals Inc.).

<Colorant>

Any of dyes and pigments may be used as the colorant in the ink composition for ink jet recording according to the present invention. However, pigments are preferred from the viewpoints of lightfastness and waterfastness.

Inorganic pigments and organic pigments are usable as the pigment. The inorganic pigments and the organic pigments may be used either solely or as a mixture of two or more. Inorganic pigments include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the ink composition to be prepared using the pigment dispersion liquid according to the present invention. Examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Examples of pigments for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Examples of pigments for cyan ink compositions include C.I. Pigment Blue 1, C.I. Pigment Blue 2, C.I. Pigment Blue 3, C.I. Pigment Blue 15:2, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred. Examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1).

In the present invention, preferably, the pigment is a pigment which has been kneaded with a dispersant which will be described later. However, pigments not subjected to surface treatment can also form excellent color images.

<Dispersant>

The ink composition according to the present invention preferably comprises a copolymer resin of a hydrophobic monomer and a hydrophilic monomer as a dispersant for dispersing a colorant. The copolymer resin is adsorbed to a pigment to improve the dispersibility of the pigment.

Specific examples of hydrophobic monomers include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimetylolpropane triacrylate, trimetylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth)acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth)acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

Examples of surfactants which are preferred as dispersants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant. In this case, however, the surfactant should be added so that the contact angle of the recording medium with the ink composition falls within the above defined range.

<Water and other Ingredients>

The ink composition for ink jet recording according to the present invention comprises the above specific solvent and surfactant, other various additives and further contains water as a solvent. Water is preferably pure water obtained by ion exchange, ultrafiltration, reverse osmosis, distillation or the like, or ultrapure water. These waters, which have been sterilized, for example, by ultraviolet irradiation or by addition of hydrogen peroxide, are particularly preferred because they can prevent the growth of mold or bacteria in the ink composition for a long period of time.

The ink composition according to the present invention may further comprise an organic amine. The organic amine can enhance the capability of wetting a recording face in a recording medium or the like in the formation of a recorded image to enhance the ink penetration. Further, when the organic amine is contained, pH of the ink composition can easily be adjusted to a suitable range. The organic amine is preferably a tertiary amine.

For example, alkanolamines such as triethanolamine may be mentioned as the tertiary amine. The pH value of the ink composition according to the present invention is preferably 8 to 12, particularly preferably 8 to 10. When the pH value is in the above-defined range, a deterioration in members in contact with the ink can be prevented.

The content of the organic amine in the total weight of the ink composition is not less than 0.1% by weight. In this case, the capability of the ink composition to wet a recording face, for example, in a recording medium in recorded image formation can be enhanced to enhance ink penetration. From the viewpoints of the ejection stability, storage stability, and high speed printing of the ink, the content of the organic amine is preferably 0.1 to 8.0% by weight, more preferably 0.5 to 5.0% by weight, still more preferably 1.0 to 3.0% by weight.

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention further comprises a solubilizer for a recording medium in addition to the above ingredients.

Pyrrolidones such as N-methyl-2-pyrrolidone and/or lactones such as γ-butyrolactone are suitable as a solubilizer for a recording medium. The addition amount of the solubilizer for a recording medium may be properly determined but is preferably about 0.1 to 30% by weight, more preferably about 1 to 20% by weight.

Preferably, the ink composition for ink jet recording according to the present invention comprises a wetting agent. Polyhydric alcohols and/or saccharides are suitable as the wetting agent. Specific examples of polyhydric alcohols include glycerin, ethylene glycol, diethylene glycol, triethylene glycol, and trimetylolpropane. Specific examples of saccharides include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. Here the term "polysaccharide" used herein means saccharides in the broad sense as including substances which exist widely in the world of nature, such as alginic acid, α-cyclodextrin and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thio-sugars. Sugar alcohols are particularly preferred, and specific examples thereof include maltitol, sorbitol, and xylitol. Further, commercially available products such as HS-500 (manufactured by HAYASHIBARA SHOJI, INC.) are also suitable. Hyaluronates may be products commercially available as a 1% aqueous solution of sodium hyaluronate (molecular weight 350000). Trimethylolpropane and 1,2,6-hexatriol are also suitable.

The addition amount of the wetting agent is preferably 3 to 30% by weight, more preferably about 3 to 20% by weight, still more preferably 3 to 10% by weight. It would be apparent to a person having ordinary skill in the art that a part of the penetration solvent functions also as a wetting agent.

In the present invention, the content ratio of the water soluble alkanediol having a hydroxyl group at both ends of its main chain to the wetting agent is preferably 1:1 to 1:10 on a weight basis. When the mixing ratio is in the above-defined range, dew formation caused by separation of the wetting agent from gloss paper of a printing paper base immediately after recording can be suppressed, and, further, the low viscosity can prevent clogging.

If necessary, other additives, for example, nozzle clogging preventives, preservatives, antioxidants, electric conductivity adjustors, pH adjustors, viscosity modifiers, surface tension modifiers, and oxygen absorbers, may be added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BND, Proxel GXL, Proxel XL-2, and Proxel TN, manufactured by ICI) may be used as preservatives and antimolds.

Examples of pH adjustors, solubilizers, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622 and Tinuvin 770 manufactured by Ciba Specialty Chemicals, K.K.; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water soluble organic solvents, saccharides, pH adjustors, preservatives and anti-molds, and satisfactorily dissolving the components. After the satisfactory stirring, the mixture is filtered for the removal of coarse particles and foreign matter causative of clogging to prepare a contemplated ink composition.

Method for Ink Jet Recording

The method for ink jet recording according to the present invention comprises ejecting droplets of the ink composition and depositing the droplets onto a recording medium to perform printing. In this method, the ejected ink droplets are deposited onto the recording medium so that dots are superimposed on top of each other. In the recording method according to the present invention, preferably, printing paper for running-on is used as the recording medium. Even when the specific recording medium is used, images possessing excellent glossiness and good color reproduction can be realized.

Further, in the method for ink jet recording according to the present invention, preferably, droplets of the ink composition are ejected so that dots in a vertical direction are alternately arranged relative to a scanning direction of the recording head. In the formation of dots in this checked pattern, when the ink composition of the present invention is used, uneven coagulation can be significantly improved as compared with the conventional ink composition.

EXAMPLES

The following Examples further illustrate the present invention. However, it should be noted that the present invention is not limited to these Examples.

<Preparation of Ink Compositions>

Ingredients were mixed together according to the formulations shown in Table 1, and the mixtures were filtered through a 10-μm membrane filter to prepare inks.

TABLE 1

| | Composition | Example 1 Ink set 1 | | | | Example 2 Ink set 2 | | | | Example 3 Ink set 3 | | | | Example 4 Ink set 4 | | | |
|---|---|---|---|---|---|---|---|---|---|---|---|---|---|---|---|---|---|
| | | 1Y | 1M | 1C | 1B | 2Y | 2M | 2C | 2B | 3Y | 3M | 3C | 3B | 4Y | 4M | 4C | 4B |
| Colorant | C.I. Pigment Yellow 74 | 3.0 | — | — | — | 3.0 | — | — | — | 3.0 | — | — | — | 3.0 | — | — | — |
| | C.I. Pigment Red 122 | — | 3.0 | — | — | — | 3.0 | — | — | — | 3.0 | — | — | — | 3.0 | — | — |
| | C.I. Pigment Blue 15:4 | — | — | 3.0 | — | — | — | 3.0 | — | — | — | 3.0 | — | — | — | 3.0 | — |
| | C.I. Pigment Black 7 | — | — | — | 3.0 | — | — | — | 3.0 | — | — | — | 3.0 | — | — | — | 3.0 |
| Styrene-acrylic resin | | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Alkane-diol | 1,2-Hexane-diol | 6.0 | 6.0 | 6.0 | 6.0 | 12 | 12 | 12 | 12 | 12 | 12 | 12 | 12 | 10 | 10 | 10 | 10 |
| | 1,5-Pentane-diol | 3.0 | 3.0 | 3.0 | 3.0 | 3.0 | 3.0 | 3.0 | 3.0 | 6.0 | 6.0 | 6.0 | 6.0 | 5.0 | 5.0 | 5.0 | 5.0 |
| Surfactant | Polysiloxane surfactant (note 1) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Triethanolamine | | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Glycerin | | 12.0 | 12.0 | 12.0 | 12.0 | 6.0 | 6.0 | 6.0 | 6.0 | 6.0 | 6.0 | 6.0 | 6.0 | 12.0 | 12.0 | 12.0 | 12.0 |
| Pure water | | Balance | Balance | Balance | Balance | Balance | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 | 100 | 100 | 100 | 100 | 100 |

| | Composition | Comparative Example 1 Ink set 5 | | | | Comparative Example 2 Ink set 6 | | | | Comparative Example 3 Ink set 7 | | | |
|---|---|---|---|---|---|---|---|---|---|---|---|---|---|
| | | 1Y | 1M | 1C | 1B | 2Y | 2M | 2C | 2B | 3Y | 3M | 3C | 3B |
| Colorant | C.I. Pigment Yellow 74 | 3.0 | — | — | — | 3.0 | — | — | — | 3.0 | — | — | — |
| | C.I. Pigment Red 122 | — | 3.0 | — | — | — | 3.0 | — | — | — | 3.0 | — | — |
| | C.I. Pigment Blue 15:4 | — | — | 3.0 | — | — | — | 3.0 | — | — | — | 3.0 | — |
| | C.I. Pigment Black 7 | — | — | — | 3.0 | — | — | — | 3.0 | — | — | — | 3.0 |
| Styrene-acrylic resin | | 1.2 | 1.2 | 1.2 | 1.2 | 1.2 | 1.2 | 1.2 | 1.2 | 1.2 | 1.2 | 1.2 | 1.2 |
| Alkane-diol | 1,2-Hexane-diol | 3.0 | 3.0 | 3.0 | 3.0 | 12 | 12 | 12 | 12 | 12 | 12 | 12 | 12 |
| | 1,5-Pentane-diol | 3.0 | 3.0 | 3.0 | 3.0 | — | — | — | — | 3.0 | 3.0 | 3.0 | 3.0 |
| Surfactant | Surfynol 465 | 0.1 | 0.1 | 0.1 | 0.1 | 0.1 | 0.1 | 0.1 | 0.1 | 0.1 | 0.1 | 0.1 | 0.1 |
| Triethanolamine | | 0.9 | 0.9 | 0.9 | 0.9 | 0.9 | 0.9 | 0.9 | 0.9 | 0.9 | 0.9 | 0.9 | 0.9 |
| Glycerin | | 12.0 | 12.0 | 12.0 | 12.0 | 12 | 12 | 12 | 12 | 3.0 | 3.0 | 3.0 | 3.0 |
| Pure water | | Balance | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 | 100 |

(note 1) The polysiloxane surfactant is AW-3: X-22-6551 = 9:1.

The styrene-acrylic acid resin in the table is a copolymer having a molecular weight of 1600 and an acid value of 150.

<Evaluation>

Ejection Stability

An ink jet printer (PX-G900, manufactured by Seiko Epson Corporation) was provided. For each of the inks prepared above, a one-raster ruled line pattern was continuously printed on photographic paper at 5° C. (low temperature) by depositing ink droplets on three dot weight levels of 3 ng, 7 ng and 14 ng. Thereafter, the thickness of the ruled line in 1000 printed sheets was observed and was evaluated based on the following criteria.

A: A reduction in the width of the ruled line of less than 10% on average

B: A reduction in the width of the ruled line of not less than 10% on average

The results of evaluation were as shown in Table 2 below.

Recovery from Clogging

The ink jet printer as used above was provided. Each ink was loaded into the head. After normal ejection of the ink through all nozzles was confirmed, in order to accelerate drying in nozzles, the ink cartridge was removed, and the recording head was removed from the head cap, followed by standing in this state under an environment of 40° C. and 20% RH for one week.

After the one-week standing, cleaning operation was repeated to determine the number of cleaning operations required for all the nozzles to normally eject the ink as in the initial state. The recovery from nozzle clogging was evaluated according to the following criteria.

A: Recovered to substantially the initial state by performing the cleaning operation three times or less.

B: Recovered to substantially the initial state by performing the cleaning operation six times or less.

C: Recovered to substantially the initial state by performing the cleaning operation six times, then allowing the nozzles to stand for 6 hr, and then further performing the cleaning operation once.

The results of evaluation were as shown in Table 2 below.

Edge Sharpness

Ink set 1 was loaded into an ink cartridge in the same ink jet printer as described above. "Futsushi Suisho, Kirei Modo (Plain Paper Recommended, Fine Mode)" was selected, and a Chinese character "墨" (font size 8) was printed on XeroxP (manufactured by Xerox Corp.) with a resolution of 1440× 720 dpi under setting of "Without Gloss Optimizer." The printed matter was then allowed to stand at 25° C. for 24 hr and was observed. The results were evaluated according to the following criteria.

A: No collapse was observed in a part "黑" in the Chinese character "墨".

B: Collapse was observed in a part "黑" in the Chinese character "墨".

Likewise, the evaluation of color reproduction was carried out for ink sets 2 to 7. The results of evaluation were as shown in Table 2.

Gloss

Ink set 1 was loaded into an ink cartridge in the same ink jet printer as used above. "Shashin Yoshi Suisho, Kirei Modo (Photographic Paper Recommended, Fine Mode)" was selected, and each ink was printed on photographic paper <Kotaku (Glossy)> (manufactured by Seiko Epson Corporation) at 100% duty to yield recorded matter with a resolution of 1440×720 dpi. The 45-degree specular gloss of the recorded matter was measured with a goniophotometer GP-200 (tradename: manufactured by Murakami Color Research Laboratory), and the gloss was evaluated according to the following criteria.

Measuring conditions were set so that the sensitivity was 500 and the 45-degree specular gloss of a standard black specular glass plate was 42.5. The results of evaluation were as shown in Table 2 below.

A: A gloss of not less than 35
B: A gloss of less than 35

Anti-Dewing

Ink set 1 was loaded into an ink cartridge in the same ink jet printer as used above. "Shashin Yoshi Suisho, Kirei Modo (Photographic Paper Recommended, Fine Mode)" was selected, and each ink was printed on photographic paper <Kotaku (Glossy)> (manufactured by Seiko Epson Corporation) at 100% duty to yield recorded matter with a resolution of 1440×720 dpi. The recorded matter was put into a glass frame immediately after recording and, in this state, was allowed to stand in an environment of temperature 40° C. and humidity 65% for 3 days. Thereafter, the glass frame was visually inspected for dewing. The results were evaluated according to the following criteria.

A: Dewing was observed on glass surface.
B: Dewing was not observed on glass surface.

The results of evaluation were as shown in Table 2 below.

TABLE 2

|  | Ejection stability | Anti-clogging property | Edge sharpness | Gloss | Anti-dewing property |
|---|---|---|---|---|---|
| Example 1 | A | A | A | A | A |
| Example 2 | A | A | A | A | A |
| Example 3 | A | A | A | A | A |
| Example 4 | A | A | A | A | A |
| Comparative Example 1 | A | A | A | B | A |
| Comparative Example 2 | B | A | B | A | B |
| Comparative Example 3 | A | B | A | A | A |

What is claimed is:

1. An ink composition for ink jet recording, comprising at least a colorant, water, an alkanediol, and a surfactant, wherein
    the alkanediol comprises a water soluble 1,2-alkanediol and a water soluble alkanediol having a hydroxyl group at both ends of its main chain and
    the surfactant is a polyorganosiloxane.

2. The ink composition for ink jet recording according to claim 1, wherein the water soluble 1,2-alkanediol is an optionally branched 1,2-alkanediol having 5 or 6 carbon atoms.

3. The ink composition for ink jet recording according to claim 2, wherein the water soluble 1,2-alkanediol is 1,2-hexanediol and/or 4-methyl-1,2-pentanediol.

4. The ink composition for ink jet recording according to claim 1, wherein the water soluble alkanediol having a hydroxyl group at both ends of its main chain is an optionally branched alkanediol having 3 to 10 carbon atoms.

5. The ink composition for ink jet recording according to claim 4, wherein the water soluble alkanediol having a hydroxyl group at both ends of its main chain is 1,5-pentanediol.

6. The ink composition for ink jet recording according to claim 1, wherein the polyorganosiloxane comprises one or at least two compounds represented by the following formula:

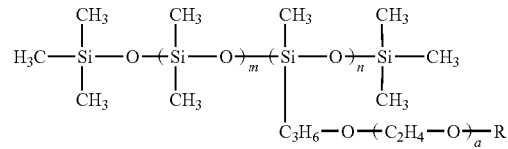

wherein R represents a hydrogen atom or a methyl group; a is an integer of 7 to 11; m is an integer of 20 to 70; and n is an integer of 2 to 5.

7. The ink composition for ink jet recording according to claim 1, wherein said polyorganosiloxane comprises one or at least two compounds represented by the following formula:

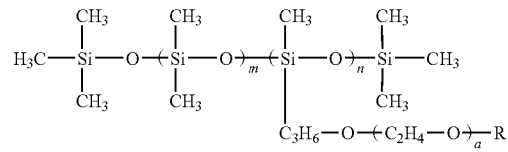

wherein R represents a hydrogen atom or a methyl group; a is an integer of 2 to 5; m is an integer of 20 to 70; and n is an integer of 2 to 4.

8. The ink composition for ink jet recording according to claim 6, wherein the surfactant further comprises a polyorganosiloxane represented by the following formula:

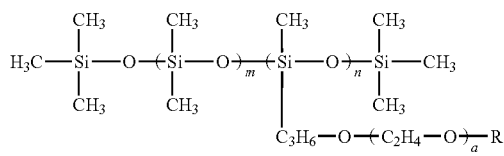

wherein R represents a hydrogen atom or a methyl group; a is an integer of 9 to 13; m is an integer of 2 to 4; and n is an integer of 1 or 2.

9. The ink composition for ink jet recording according to claim 1, wherein the water soluble 1,2-alkanediol is contained in an amount of not less than 6% by weight based on the whole ink composition.

10. The ink composition for ink jet recording according to claim 1, wherein the water soluble alkanediol having a hydroxyl group at both ends of its main chain is contained in an amount of not less than 3% by weight based on the whole ink composition.

11. The ink composition for ink jet recording according to claim 1, wherein the addition amount ratio of the water soluble 1,2-alkanediol to the water soluble alkanediol having a hydroxyl group at both ends of its main chain is 10:1 to 1:1 on a weight basis.

12. The ink composition for ink jet recording according to claim 1, which further comprises a wetting agent.

13. The ink composition for ink jet recording according to claim 12, wherein said wetting agent is glycerin and/or sugar.

14. The ink composition for ink jet recording according to claim 12 or 13, wherein the wetting agent is contained in an amount of 3% to 20% by weight based on the whole ink composition.

15. The ink composition for ink jet recording according to claim 12, wherein the addition amount ratio of the water soluble alkanediol having a hydroxyl group at both ends of its main chain to the wetting agent is 1:1 to 1:10 on a weight basis.

16. A method for ink jet recording, comprising the step of ejecting droplets of an ink composition and depositing the droplets onto a recording medium to perform printing, wherein the ink composition is an ink composition for ink jet recording according to claim 1.

17. A recorded matter recorded by the method for ink jet recording according to claim 16.

18. An ink composition for ink jet recording, comprising at least a colorant, water, an alkanediol, and a surfactant, wherein the alkanediol comprises a water soluble 1,2-alkanediol and a water soluble alkanediol having a hydroxyl group at both ends of its main chain and the surfactant is a polyorganosiloxane, wherein the water soluble 1,2-alkanediol is present in the ink composition in an amount of not less than 6% by weight of the ink composition and the water soluble alkanediol having a hydroxyl group at both ends is present in the ink composition in an amount of not less than 3% by weight of the ink composition, and wherein the polyorganosiloxane surfactant is present in the ink composition in an amount effective to make the ink composition less likely to clog a nozzle of an ink jet printer than the ink composition without the polyorganosiloxane surfactant.

* * * * *